W. A. Middleton,
Clothes Rack,
No. 83,195.      Patented Oct. 20, 1868.
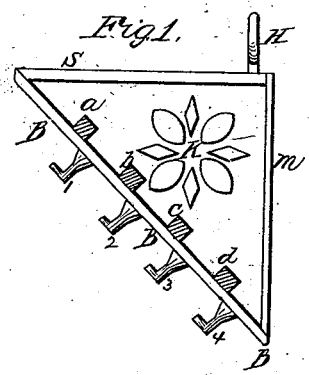
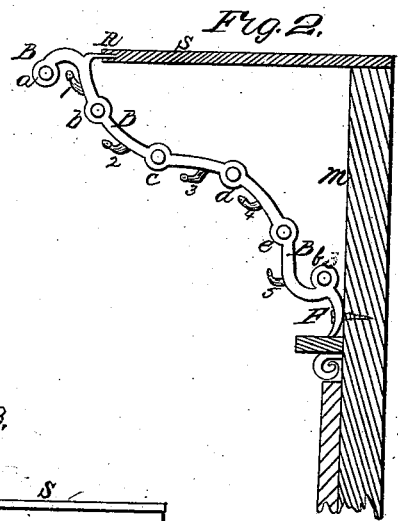
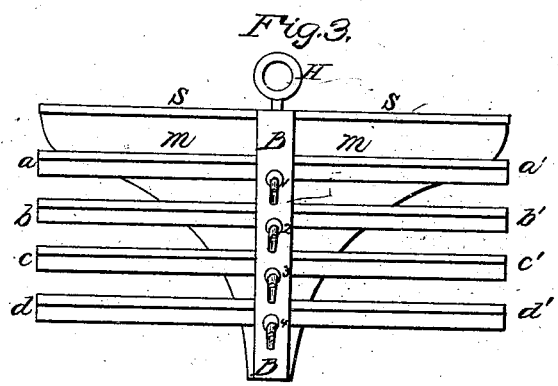
Witnesses:
Theophilus Weaver
John A. Haller
Inventor:
Wm. A. Middleton

WILLIAM A. MIDDLETON, OF HARRISBURG, PENNSYLVANIA.

Letters Patent No. 83,195, dated October 20, 1868.

IMPROVED BRACKET AND RACK.

The Schedule referred to in these Letters Patent and making part of the same.

*To all whom it may concern:*

Be it known that I, WILLIAM A. MIDDLETON, of Harrisburg, in the county of Dauphin, and State of Pennsylvania, have invented a new and useful Bracket and Rack; and I do hereby declare that the following is a full, clear, and exact description of the construction and operation of the same, reference being had to the annexed drawings, making a part of this specification, in which—

Figure 1 represents an end view of a bracket and rack.

Figure 2 represents an end view of a detachable and removable bracket and rack.

Figure 3 is a front view, of which fig. 1 is an end view.

I construct my rack in the following manner, of any suitable materials:

The arms $a$, $b$, $c$, $d$, &c., as shown in figs. 1 and 2, are arranged in a retreating or diagonal line from the outer edge of a shelf, clock, or other mantel, to the base of the wall-piece M, by which such shelf or mantel is supported. The arms are placed in the bracket B B, as shown in figs. 1 and 2, in a line parallel with the shelf-board S and wall-board M. The sockets or places made for the reception of the arms may be rectangular, as shown in fig. 1, or circular, as shown in fig. 2. The bracket B B may be made to hold the arms permanently, by a strip or ledge fastened over them; or it may be made detachable and removable. When made detachable, as shown in fig. 2, the bracket B B is provided with a holder, R, which is made to enter the outer edge of shelf or mantel, or its equivalent, and a foot, F, which rests against wall-board M, or its equivalent, and may be provided with a screw, as at F. In fig. 2, the sockets $a$, $b$, $c$, &c., are made in such manner as to enable the arms to be removed at will.

In fig. 3 is shown a front view, of which fig. 1 is an end view. The bracket B B is made to support two series of arms, $a\ b\ c\ d$ and $a'\ b'\ c'\ d'$. If greater firmness in the support of said arms is needed, it is plain that more than one bracket may be used, placed near together.

In all the figures, the figures or numerals 1, 2, 3, 4, &c., represent clothes-hooks, which are attached to or form a part of the bracket B. These are placed on the under side of the same.

The advantages of this rack are that the recess beneath a clock-case, mantel, or other wall-fixture in a room, can be utilized by mounting arms on the bracket by which such article is supported; or when no suitable bracket is in use, to supply a detachable or removable one for the purpose. It can be made ornamental, will be no hindrance, and can be made cheaply. It can also be used to file or hang papers upon it.

I claim the combination of the bracket S M B with the two series of arms $a\ a'\ b\ b'\ c\ c'\ d\ d'$, with or without the hooks, as and for the purpose specified.

WM. A. MIDDLETON.

Witnesses:
 THEOPHILUS WEAVER,
 JOHN A. HALLER.